(12) United States Patent
Vignotto et al.

(10) Patent No.: US 7,073,950 B2
(45) Date of Patent: Jul. 11, 2006

(54) LOCKING DEVICE FOR A WHEEL HUB BEARING

(75) Inventors: Angelo Vignotto, Turin (IT); Massimo Marivo, Airasca (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 10/267,072

(22) Filed: Oct. 7, 2002

(65) Prior Publication Data
US 2003/0099419 A1    May 29, 2003

(30) Foreign Application Priority Data
Nov. 28, 2001    (IT)   .................. TO2001A01110

(51) Int. Cl.
*F16C 27/04* (2006.01)
(52) U.S. Cl. ...................................... 384/482
(58) Field of Classification Search ................ 384/484, 384/486, 482, 903, 537
See application file for complete search history.

(56) References Cited

U.S. PATENT DOCUMENTS

| 3,940,863 A | 3/1976 | McCloskey |
| 4,411,545 A | 10/1983 | Roberge |
| 4,710,037 A | 12/1987 | Newberg |
| 4,840,498 A | 6/1989 | Lichtfuss |
| 4,914,865 A | 4/1990 | Wiand |
| 5,087,131 A | 2/1992 | D'Andrea |
| 5,482,379 A | 1/1996 | Harris |
| 5,839,834 A | 11/1998 | Acampora, Jr. |
| 5,927,867 A | 7/1999 | Niebling et al. |
| 6,007,253 A | 12/1999 | Rutter |

FOREIGN PATENT DOCUMENTS

DE    198 60 345 A1    6/2000

OTHER PUBLICATIONS

Rod End "Report Card", Zurvalec.

*Primary Examiner*—Lenard A. Footland
(74) *Attorney, Agent, or Firm*—Merchant & Gould

(57) ABSTRACT

Locking device (1) (101) for a bearing (2) in a wheel hub (3) which is provided with a cylindrical seat (4) for the bearing (2) itself and an annular groove (5) which is obtained in the axial end of the cylindrical seat (4), the locking device (1) (101) presenting a fixing element (10) which is driven onto an outer race (8) of the bearing (2); a blocking element (11) which is arranged inside the annular groove (5); and a connecting element (12) which is used to connect the fixing element (10) and the blocking element (11) to each other and which is provided with a support resiliently yieldable at least in a radial direction and which is suitable for co-operating with the blocking element (11) itself in order to permit the introduction of the blocking element (11) into the annular groove (5) of the wheel hub (3).

19 Claims, 2 Drawing Sheets

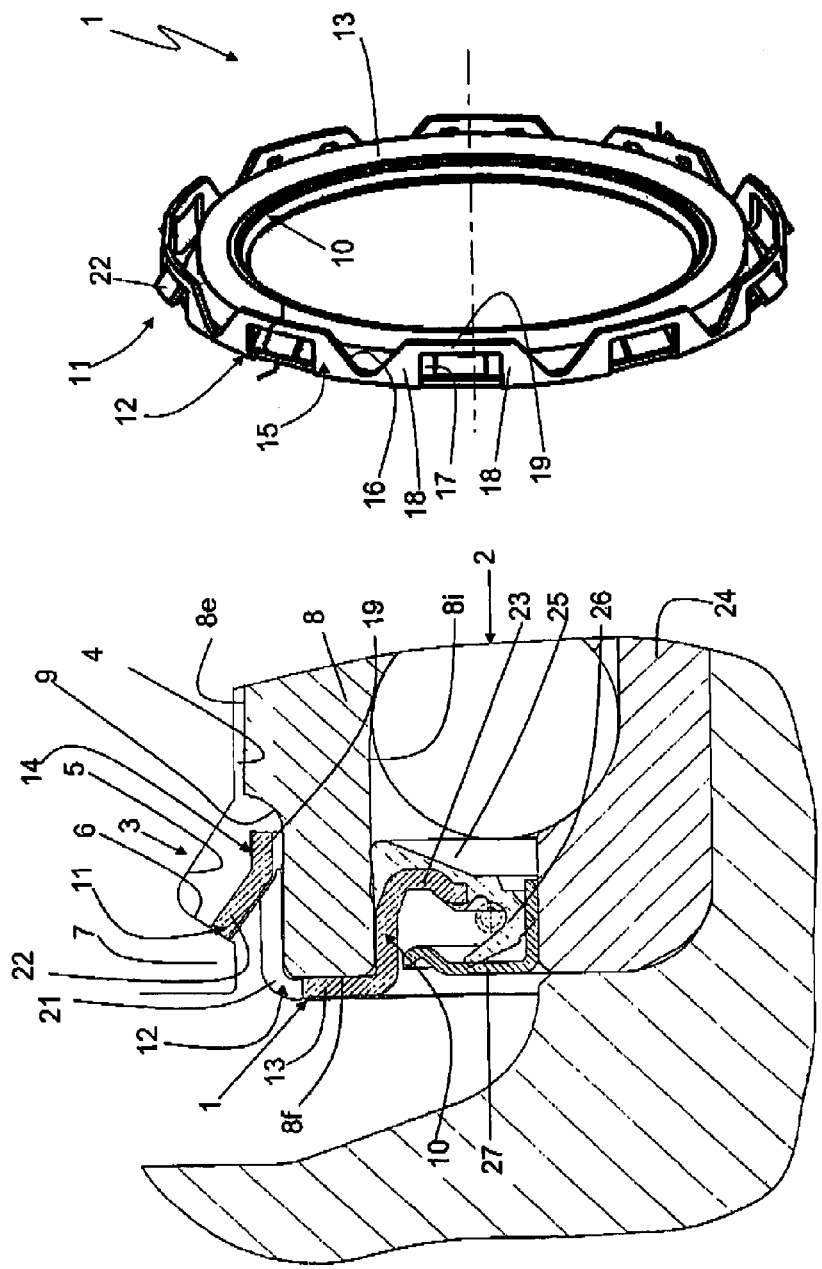

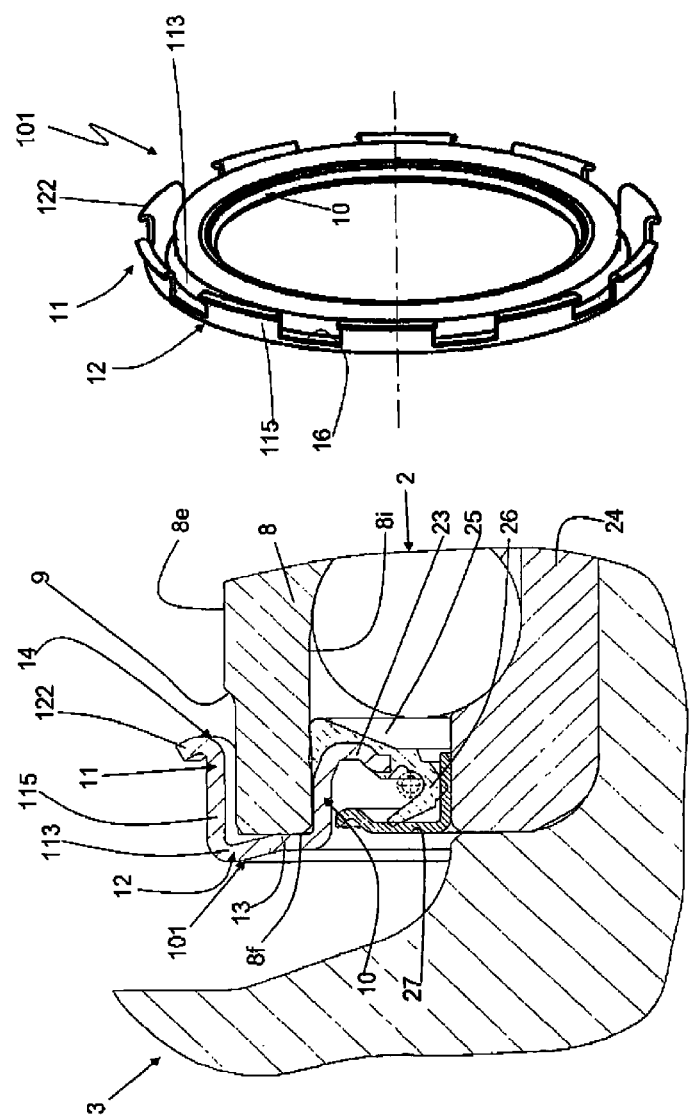

LOCKING DEVICE FOR A WHEEL HUB BEARING

DESCRIPTION

The present invention relates to a locking device for a wheel hub bearing.

The U.S. Pat. No. 6,007,253 makes known a locking device for a wheel hub bearing which is provided with a cylindrical seat, which houses the bearing and which is axially delimited on its own axial end by an annular groove and a shoulder defining a check for an outer race of the bearing.

The locking device comprises:
- a fixing device which is driven onto an inner surface of the outer race;
- a resiliently yielding blocking element which is arranged inside the annular groove in order to axially block the outer race; and
- a connecting element which is between the fixing element and the blocking element and which is defined by a substantially rigid flange which is placed against a frontal annular surface of the outer race.

The U.S. Pat. No. 5,927,867 also makes known a locking device for a wheel hub bearing, but this locking device differs from the other because, except for the absence of the fixing element which is substituted by a support flange for a sensor, the connecting element comprises, apart from the substantially rigid flange which is placed against the frontal annular surface of the outer race, a cylindrical race, which is fitted onto an outer surface of the outer race, and from which the blocking element extends and is inclined at a determined angle towards the outside of the bearing.

Both the locking devices which are described above are initially mounted onto the outer race of the bearing and are then inserted inside the cylindrical seat together with the bearing itself, and are then pushed inside the cylindrical seat until they elastically deform the blocking element which returns to its original undeformed configuration once it is inside the annular groove.

In the locking device which is the subject of the first U.S.A. Patent described above, however, the force which is necessary to deform the blocking element until it can be inserted into the annular groove is not very high, and neither is the blocking capacity of the blocking element, which is to the detriment of the precision of the mounting operation, in the locking device which is the subject of the second U.S.A. Patent described above these characteristics are considerably elevated with the disadvantage, however, of making it much more difficult to insert the blocking element into the annular groove due to the mechanical resistance presented by the various components, above all the connecting element.

The aim of the present invention is to produce a locking device for a wheel hub bearing, which will not present the disadvantages which have been described above.

According to the present invention, a locking device for a wheel hub bearing will be produced, which is provided with a cylindrical seat for the bearing itself and which is also provided with at least one annular groove which is obtained in an axial end of the cylindrical seat, the device comprising:
- a fixing element which is driven onto an internal surface of an outer race of the bearing;
- a blocking element which is arranged inside the annular groove in order to axially block the outer race; and
- a connecting element which is used in order to connect the fixing element and the blocking element to each other and which comprises an annular portion which is placed against an annular frontal portion of the outer race;
- the locking device being characterised by the fact that the connecting element also comprises a support element for the resiliently yieldable blocking element at least in a radial direction and which is suitable for co-operating with the blocking element itself in order to permit the introduction of the blocking element into the annular groove of the wheel hub.

The present invention will now be described with reference to the attached drawings, which illustrate a non-limiting embodiment of the present invention, and in which:

FIG. 1 illustrates, with some parts in section and some parts removed for reasons of clarity, a first preferred embodiment of a locking device for a wheel hub bearing according to the present invention;

FIG. 2 is a perspective view, on a reduced scale, of the locking device shown in FIG. 1;

FIG. 3 illustrates, with some parts in section and some parts removed for reasons of clarity, a second preferred embodiment of the locking device shown in FIG. 1; and FIG. 4 is a perspective view, on a reduced scale, of the locking device shown in FIG. 3.

With reference to FIGS. 1 and 2, the number 1 indicates in its entirety a locking device for a bearing 2 of a wheel hub 3.

The wheel hub 3 is provided with a cylindrical seat 4 which presents a longitudinal axis A, and is also provided with two annular grooves 5 (only one of which is illustrated), which are obtained in the axial end opposite the seat 4, and which present respective conical support surfaces 6 which are arranged with their own convexity towards the inside of the seat 4. Each annular groove 5 also defines a respective annular tooth 7 which is arranged between the relative annular groove 5 and the outside of the seat 4.

The bearing 2 comprises a fixed outer race 8, which is inserted inside the seat 4, and which is radially delimited by an internal cylindrical surface $8i$ and an external cylindrical surface $8e$, and which is axially delimited towards the outside by a frontal annular surface $8f$ which is transversally arranged to the two surfaces $8i$ and $8e$. Furthermore, the race 8 also presents two annular relieves 9 (only one of which is illustrated) which are obtained between the surface $8e$ and the relative surface $8f$ in order that each of them can house, at least in part, a relative locking device 1.

For reasons of illustrative simplicity and clarity, the description which follows will make reference, unless otherwise specified, to a single annular groove 5 and the relative locking device 1 which is installed in it.

The locking device 1 comprises a fixing race 10 which is driven onto the surface $8i$, and a blocking element 11 which is arranged inside the annular groove 5 in order to axially block the race 8 of the bearing 2.

The locking device 1 also comprises a connecting element 12, which is interposed between the race 10 and the element 11, and which is provided with a flange 13 which is placed against the surface $8f$ of the race 8, and is also provided with a support portion 14 for the blocking element 11 which is arranged inside the relief 9 of the race 8 itself.

The support portion 14 is resiliently yieldable in a radial direction and is suitable for cooperating with the blocking element 11 in order to permit the introduction of the blocking element 11 itself into the inside of the annular groove 5 of the wheel hub 3.

In particular, the support portion 14 is defined by a cylindrical wall 15 which is provided with a number of notches 16 in the shape of a V, which are axially open on part which is turned towards the bearing 2, and which are equally distributed along the cylindrical wall 15. Between each pair of notches 16, the support portion 14 presents a window 17 which is defined by two axial arms 18 which are also delimited by the relative notches 16, and is also defined by a circumferential crosspiece 19 which is connected to both the arms 18.

Each crosspiece 19 presents an internal diameter which is greater than an external diameter of the relief 9, while each arm 18 is connected to the adjacent arm 18 and presents a folded portion 21 which is connected to the flange 13.

The blocking element 11 comprises, for each window 17, a respective tongue 22, which is fitted into the relative crosspiece 19, and which is radially raised towards the outside in relation to the cylindrical wall 15.

In particular, each flap 22 is inclined towards the outside of a substantially acute angle in such a way as to permit, in the first place, a normal positioning of the flap 22 on the surface 6 of the annular groove 5, and, in second place, in such a way as to determine an overall external radial dimension of the blocking element 11 which is substantially similar to the external radial dimensions of the outer race 8 of the bearing 2.

The race 10 is connected towards the outside of the bearing 2 to the flange 13, while, on the part which extends towards the inside of the bearing 2 itself, it presents a shield 23 which extends from the outer race 8 towards an inner race 24 of the bearing 2, and it also presents a seal 25 in the form of a lip, which is integral to the shield 23 and which is interposed between the races 8 and 24.

In particular, the seal 25 comprises a lip 26 which is arranged in sliding contact with a second shield 27 which is mounted onto the race 24 in order to increase the sealing characteristics of the seal 25 itself.

During the assembly phase, once the race 10 of the locking device 2 has been fitted onto the outer race 8 of the bearing 2, the latter is pushed inside the seat 4 by applying an axial thrust directly onto the flange 13.

When the flaps 22 come into contact with the teeth 7, the axial thrust and the particular conformation of the flaps 22 themselves determine a torsion of the relative crosspiece 19 in relation to the arms 18, and there is also a contemporary flexing of the arms 18 themselves with the double result that the flaps 22 are flattened very easily inside the relative windows 17 and that the entire support portion 14 yields in a radial direction so that it becomes even lower inside the relief 9.

Obviously, this double result makes it easier to insert the flaps 22 inside the annular groove 5, and thus, the assembly of the bearing 2 onto the wheel hub 3 is also made easier.

Once the flaps 22 are free of the obstacle presented by the teeth 7 because they have finally been positioned inside the annular groove 5, the elastic nature of the arms 18 as well as of the crosspieces 19 and the support portion 14, means that the flaps 22 are positioned in stable fashion against the surface 6 so that they block any axial movement which might result in the bearing 2 slipping out of the seat 4.

Instead, in the case in which the bearing 2 is provided with two locking devices 1, the latter will be mounted onto the outer race 8 with the tongues/flaps 22 turned in the opposite direction in such a way that, once the tongues/flaps 22 of the second locking device 1 have been arranged inside the second annular groove 5, the bearing 2 will be axially blocked on both sides.

The form of embodiment which is illustrated in FIGS. 3 and 4 relates to a locking device 101 which is similar to the locking device 1, from which the locking device 101 differs in the first place because the notches 16 are not in the shape of a V, but are of a substantially rectangular shape and define respective flexible arms 115 in relation to each other, the flexible arms 115 being arranged inside the relief 9 and maintaining a certain radial distance from the base of the relief 9 itself, and presenting a flap 122 at one of their own free ends, the flap 122 being realised by turning the free end itself radially towards the outside.

Furthermore, the support portion 14 presents an axially elastic portion 113, which is defined by the entire portion 21 in order to connect the arms 115 to the flange 13, and which also extends along part of the flange 13 itself, and which is axially spaced from the surface 8f.

The particular conformation of the support portion 14 of the locking device 101 gives the blocking element 11 a deformable capacity in an axial direction as well as in a radial direction. The result, obviously, is that it is even easier to mount a bearing 2 which is provided with one or two locking devices 101 which are mounted on the end of the race 8.

It is intended that the present invention not be limited to the forms of embodiment herein described and illustrated, which are to be considered as examples of forms of embodiment of a locking device, which might be subject to further modifications in relation to the shape and disposition of its parts, as well as to details pertaining to its construction and assembly.

The invention claimed is:

1. Locking device for a bearing of a wheel hub which is provided with a cylindrical seat for the bearing and at least one annular groove at an axial end of the cylindrical seat, the device comprising:
   a fixing element which engages an internal surface of an outer race of the bearing;
   a blocking element, the blocking element being resiliently yieldable and arranged inside the annular groove in order to axially block the outer race;
   a connecting element which connects the fixing element and the blocking element, the connecting element including an annular portion which is placed against an annular frontal portion of the outer race; and
   a support portion for the blocking element positioned parallel to and adjacent an outer surface of the outer race which is suitable for co-operating with the blocking element to permit introduction of the blocking element into the annular groove of the wheel hub,
   wherein the support portion for the blocking element is also resiliently yieldable in an axial direction.

2. Locking device according to claim 1, wherein the support portion is defined by a cylindrical wall which is provided with a number of notches which are axially open on one side and which are equally distributed along the cylindrical wall and the blocking element comprises, in relation to each notch, a flap which is both raised and inclined in relation to the cylindrical wall at a substantially acute angle.

3. Locking device according to claim 1, wherein the support portion for the resiliently yieldable blocking element is arranged inside an annular relief which is at an outside of the outer race of the bearing.

4. Locking device according to claim 1, wherein the support portion comprises a cylindrical wall which is provided with a number of notches which are axially open on one side and which are equally distributed along the cylindrical wall; and the blocking element also comprises, for each notch, a flap which is inclined in relation to the cylindrical wall at a substantially acute angle.

5. Locking device according to claim 4, wherein the support portion defines part of the annular portion and is axially spaced from the annular portion of the outer race.

6. Locking device according to claim 5 wherein the cylindrical wall is arranged inside an annular relief which is at an outside of the outer race of the bearing.

7. Looking device according to claim 1, further comprising a sealing element which is integral to the fixing element and which is interposed between an inner race of the bearing and the outer race.

8. Locking device according to claim 1, wherein the blocking element has an external diameter equal to an outer diameter of the outer race.

9. Locking device according to claim 1, wherein the support portion defines part of the annular portion and is axially spaced from the annular portion of the outer race.

10. Locking device for a bearing of a wheel hub which is provided with a cylindrical seat for the bearing and at least one annular groove at an axial end of the cylindrical seat, the device comprising:
   a fixing element which engages an internal surface of an outer race of the bearing;
   a blocking element, the blocking element being resiliently yieldable and arranged inside the annular groove in order to axially block the outer race;
   a connecting element which connects the fixing element and the blocking element, the connecting element including an annular portion which is placed against an annular frontal portion of the outer race; and
   a support portion for the blocking element positioned parallel to and adjacent an outer surface of the outer race which is suitable for co-operating with the blocking element to permit introduction of the blocking element into the annular groove of the wheel hub;
   wherein the support portion defines part of the annular portion and is axially spaced from the annular portion of the outer race.

11. Locking device according to claim 10 wherein the support portion for the blocking element is also resiliently yieldable in an axial direction.

12. Looking device according to claim 10, wherein the support portion is defined by a cylindrical wall which is provided with a number of notches which are axially open on one side and which are equally distributed along the cylindrical wall and the blocking element comprises, in relation to each notch, a flap which is both raised and inclined in relation to the cylindrical wall at a substantially acute angle.

13. Locking device according to claim 12, further comprising a sealing element which is integral to the fixing element and which is interposed between an inner race of the bearing and the outer race.

14. Locking device according to claim 10, wherein the support portion for the resiliently yieldable blocking element is arranged inside an annular relief which is at an outside of the outer race of the bearing.

15. Locking device for a bearing of a wheel hub which is provided with a cylindrical seat for the bearing and at least one annular groove at an axial end of the cylindrical seat, the device comprising:
   a fixing element which engages an internal surface of an outer race of the bearing;
   a blocking element, the blocking element being resiliently yieldable and arranged inside the annular groove in order to axially block the outer race;
   a connecting element which connects the fixing element and the blocking element, the connecting element including an annular portion which is placed against an annular frontal portion of the outer race; and
   a support portion for the blocking element positioned parallel to and adjacent an outer surface of the outer race which is suitable for co-operating with the blocking element to permit introduction of the blocking element into the annular groove of the wheel hub;
   wherein the support portion for the resiliently yieldable blocking element is arranged inside an annular relief which is at an outside of the outer race of the bearing.

16. Locking device according to claim 15, wherein the support portion defines part of the annular portion and is axially spaced from the annular portion of the outer race.

17. Locking device according to claim 15 wherein the support portion for the blocking element is also resiliently yieldable in an axial direction.

18. Locking device according to claim 15, wherein the support portion is defined by a cylindrical wall which is provided with a number of notches which are axially open on one side and which are equally distributed along the cylindrical wall and the blocking element comprises, in relation to each notch, a flap which is both raised and inclined in relation to the cylindrical wall at a substantially acute angle.

19. Locking device according to claim 15, further comprising a sealing element which is integral to the fixing element and which is interposed between an inner race of the bearing and the outer race.

* * * * *